United States Patent
Matsutori

(10) Patent No.: US 6,675,632 B2
(45) Date of Patent: Jan. 13, 2004

(54) INSIDE DIAMETER MEASURING METHOD AND APPARATUS

(75) Inventor: Hideki Matsutori, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 10/228,071

(22) Filed: Aug. 27, 2002

(65) Prior Publication Data

US 2003/0041468 A1 Mar. 6, 2003

(30) Foreign Application Priority Data

Aug. 29, 2001 (JP) ........................... 2001-259579

(51) Int. Cl.⁷ .............................................. G01B 13/00
(52) U.S. Cl. ........................... 73/37.9; 73/1.57; 73/37.5
(58) Field of Search ................. 73/37.9, 37.5, 73/1.57, 543.1

(56) References Cited

U.S. PATENT DOCUMENTS

| | | | | |
|---|---|---|---|---|
| 2,486,052 A | * | 10/1949 | Moore .......................... | 73/37.9 |
| 4,088,009 A | | 5/1978 | Fukuda | |
| 4,704,896 A | * | 11/1987 | Parsons ....................... | 73/37.9 |
| 4,776,204 A | * | 10/1988 | Batcher et al. ............... | 73/37.9 |
| 5,212,980 A | | 5/1993 | Wegmann | |
| 5,653,037 A | * | 8/1997 | Hasegawa et al. .......... | 33/543.1 |

FOREIGN PATENT DOCUMENTS

EP 0 109 936 5/1984
WO WO 02/065054 A1 8/2002

OTHER PUBLICATIONS

Derwent Abstract Accession No. 908–275575/25, Class S02, JP 10–089941 A (Honda Motor Co Ltd) Apr. 10, 1998–English Abstract.
Patent Abstracts of Japan, JP 6–304776 A (Fuji Koki Seisakusho KK et al.) Jun. 18, 1996–English Abstract.
Patent Abstracts of Japan, JP 56–111423 A (Cosmo Keiko KK) Sep. 3, 1981–English Abstract.

* cited by examiner

*Primary Examiner*—Edward Lefkowitz
*Assistant Examiner*—Michael Cygan
(74) *Attorney, Agent, or Firm*—Nixon Peabody LLP; David S. Safran

(57) ABSTRACT

The inside diameter measuring method and apparatus are capable of making accurate measurement. In the inside diameter measuring method of measuring an inside diameter of a cylindrical work by supplying compressed air from one end of the work and by detecting a back pressure of the compressed air, a correction amount of measured value of the inside diameter according to a length of the work is obtained in advance by determining a change of measured value of the inside diameter with respect to a change of the length of the work, whereby the measured value of the inside diameter is corrected according to the length of the work. Thereby, even in the case where a plurality of works having a different length are measured, accurate measurement can always be made.

2 Claims, 9 Drawing Sheets

INSIDE DIAMETER MEASURING METHOD AND APPARATUS

BACKGROUND OF THE INVENTION

1. Field of the Invention

The present invention relates to an inside diameter measuring method and apparatus. More particularly, it relates to an inside diameter measuring method and apparatus for measuring an inside diameter of a minute cylindrical work such as ferrule and injection.

2. Description of the Related Art

When the inside diameter of a minute cylindrical work such as a ferrule is measured, measurement has so far been made by inserting a pin gage of a predetermined size into the inner peripheral portion of the work by a person who makes measurement. In the measurement using the pin gage, however, it is necessary for the measurer to manually make measurement one work after another, which presents a drawback of requiring much labor. Also, the conventional measuring method has a drawback of poor accuracy because of manual operation.

The inventor has proposed a method in which compressed air is supplied into the inner peripheral portion of work, and a change of back pressure is detected to measure the inside diameter of work, in Japanese Patent Application No. 2001-40669 corresponding to International Patent Application No. PCT/JP02/01086 (which was, at the time the present invention was made, not published, not publically known, and assigned to the same assignee to which the present invention was subject to an obligation of assignment). This method has an advantage that because compressed air is merely supplied to the work, measurement can be made in a short period of time, and also because of no wear, stable measurement can always be made even after long-term use.

When many works are measured at one time using the above-described method, however, if individual works have variations in length, different back pressures are detected even if the works have the same inside diameter. As a result, there arises a drawback of variations in measured value.

SUMMARY OF THE INVENTION

The present invention has been achieved in view of the above situation, and accordingly an object thereof is to provide an inside diameter measuring method and apparatus capable of making accurate measurement even if a length of work varies.

To attain the above object, the present invention is directed to an inside diameter measuring method of measuring an inside diameter of a cylindrical work by supplying compressed air from one end of the work and by detecting the back pressure of the compressed air, wherein a correction amount of measured value of the inside diameter according to the length of the work is obtained in advance by determining a change of measured value of the inside diameter with respect to a change of length of the work, whereby the measured value of the inside diameter is corrected according to the length of the work.

The present invention is also directed to an inside diameter measuring apparatus which measures an inside diameter of a cylindrical work by supplying compressed air from one end of the work and by detecting a back pressure of the compressed air, comprising: a length measuring device which measures a length of the work; a storage device which stores a correction amount of measured value of the inside diameter according to the length of the work; and a correcting device which corrects a measured inside diameter of the work based on the length of the work measured by the length measuring device and the correction amount stored in the storage device.

According to the present invention, the measured value of the inside diameter is corrected according to the length of the work by obtaining a correction amount of measured value of the inside diameter according to the length of the work in advance. Thereby, accurate measurement can be made even in the case where a plurality of works having a varied length are measured.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of an inside diameter measuring method and apparatus in accordance with the present invention will now be described in detail with reference to the accompanying drawings.

Figure 1:
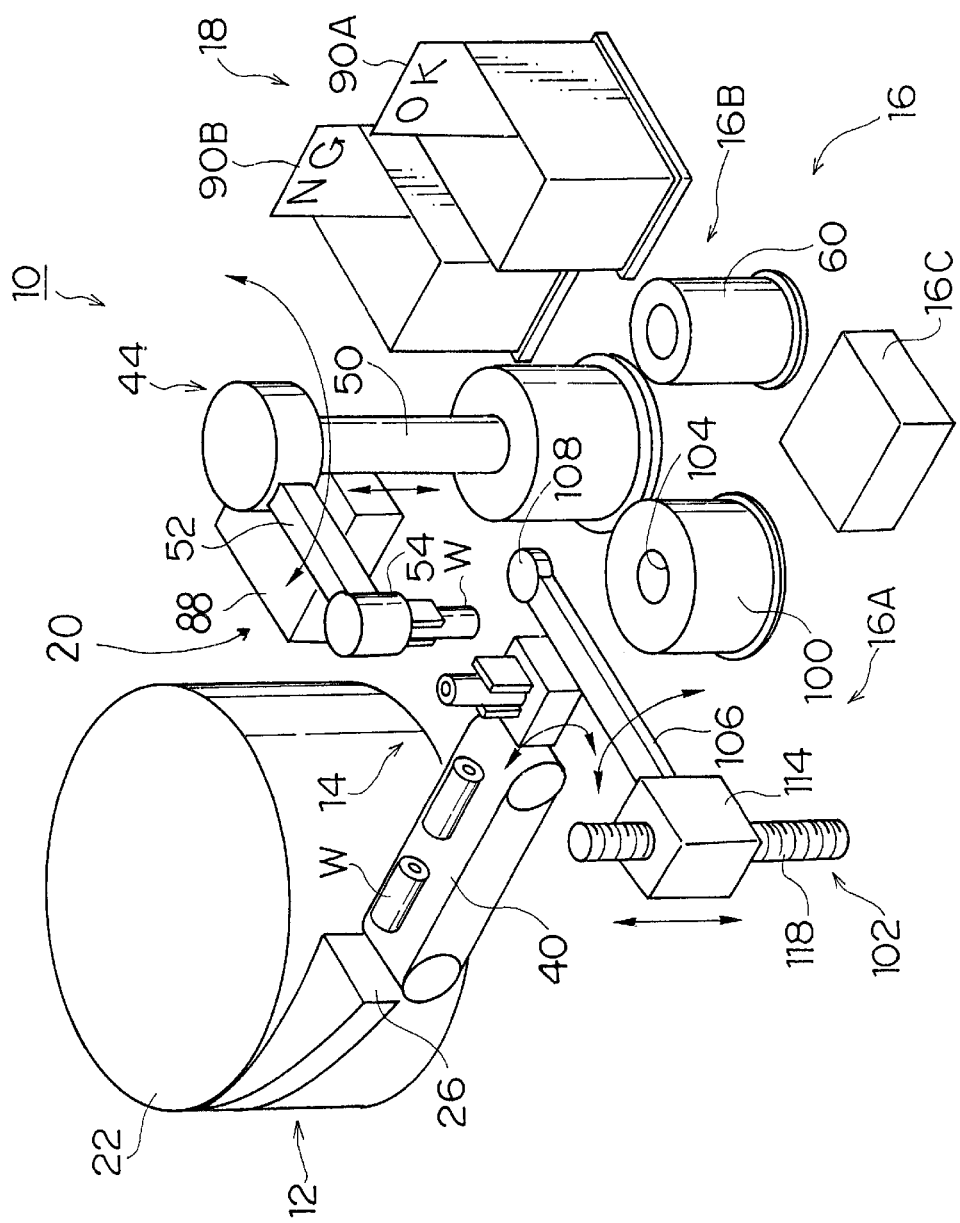
FIG. 1 is a general configuration view showing one embodiment of an inside diameter measuring apparatus in accordance with the present invention.

FIG. 1 is a general configuration view showing one embodiment of an inside diameter measuring apparatus in accordance with the present invention. An inside diameter measuring apparatus 10 of this embodiment is composed of a feed section 12, a conveyance section 14, a measurement section 16, a recovery section 18, a master storage section 20, and a control section (not shown).

Figure 9:
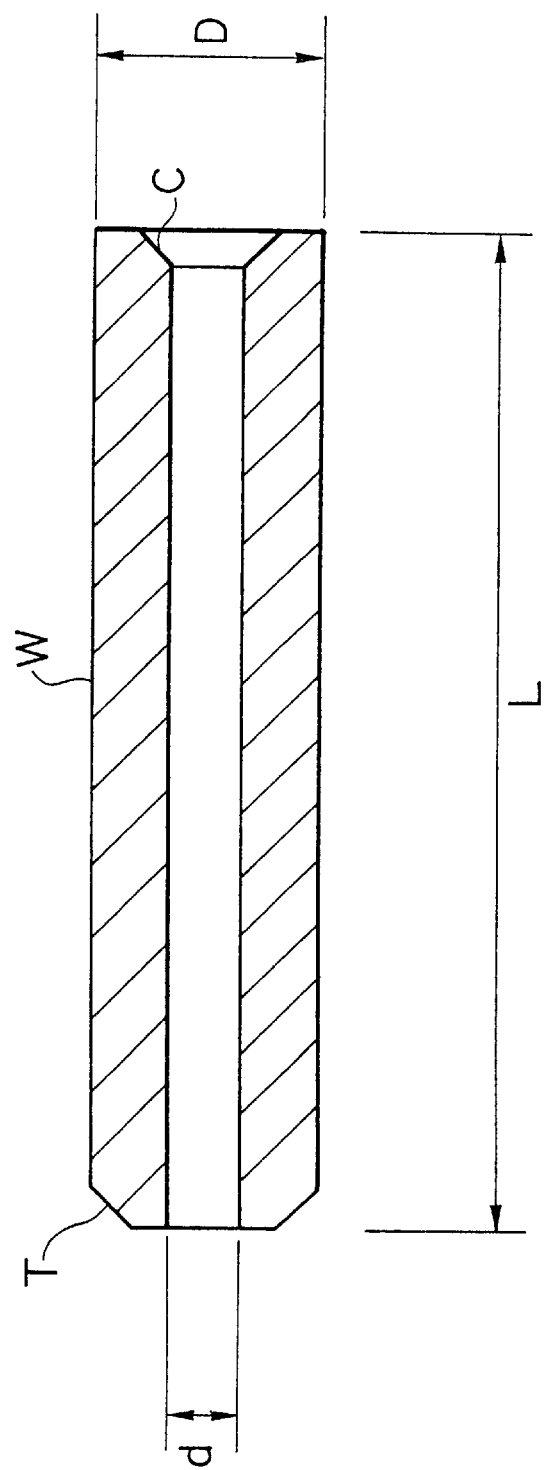
FIG. 9 is a sectional view showing a configuration of a work.

This inside diameter measuring apparatus 10 measures the inside diameter of a work W, and sorts and recovers the work W according to the measurement result. The work W to be measured is a ferrule, an optical connector part. The ferrule has a minute cylindrical shape, for example, having an outside diameter D of 2.5 mm, an inside diameter d of 0.125 mm, and a length L of 10 mm as shown in FIG. 9.

The feed section 12 feeds the work W. This feed section 12 is provided with a parts feeder 22. The parts feeder 22 feeds many works W stored in a stocker incorporated therein one after another through a feed port 26 in a state in which the works W are arranged in one direction.

Figure 2:
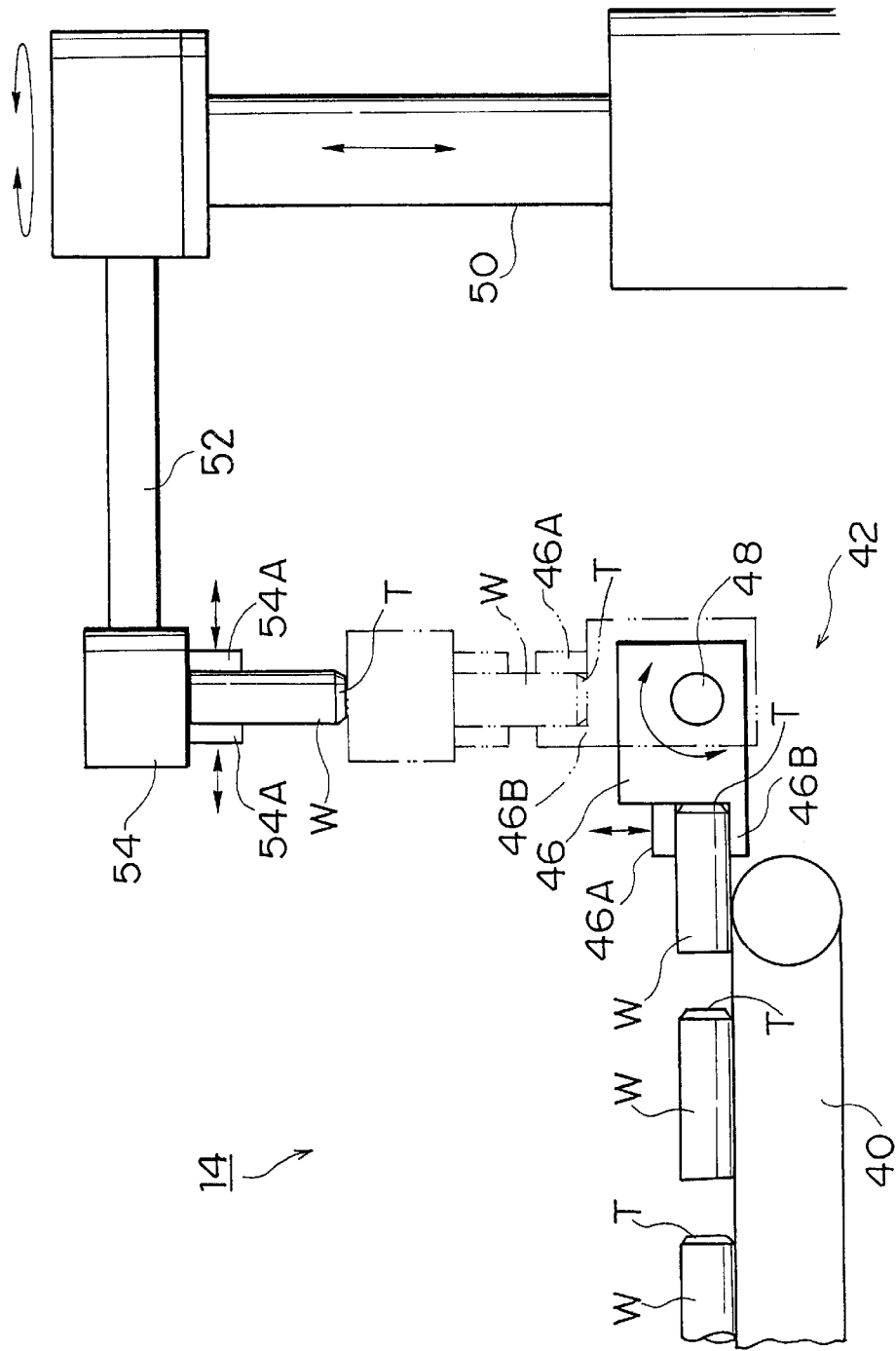
FIG. 2 is a schematic view showing a configuration of a conveyance section.

The conveyance section 14 conveys the work W fed from the parts feeder 22 to the measurement section 16, and conveys the work W having been measured by the measurement section 16 to the recovery section 18. As shown in FIGS. 1 and 2, this conveyance section 14 includes a conveyor 40, a direction changing device 42, and a transfer robot 44.

The conveyor 40 horizontally conveys the work W fed through the feed port 26 of the parts feeder 22 to the direction changing device 42.

The direction changing device 42 turns the work W having been conveyed horizontally by the conveyor 40 through 90 degrees to raise it to a vertical position. As shown in FIG. 2, this direction changing device 42 includes a damper 46 and a damper turning mechanism (not shown) for turning the damper 46.

The clamper 46 has two clamp jaws 46A and 46B, and is configured so that one clamp jaw 46A can advance toward and retreat from the other clamp jaw 46B. By the movement of one clamp jaw 46A toward the other clamp jaw 46B, the work W is clamped, while by the movement in the opposite direction, the work W is unclamped.

The clamper turning mechanism turns the damper 46 in the range of 90 degrees by turning a rotating shaft 48 fixed to the damper 46. The damper 46 adopts two postures, a horizontal receiving posture (posture indicated with solid lines in FIG. 2) and a vertical transferring posture (posture indicated with alternate long and two short dashes lines in FIG. 2), by being driven by the damper turning mechanism.

The operation of the direction changing device 42 having the above-described configuration will be as described below. The front end portion of the work W having been conveyed horizontally by the conveyor 40 comes into contact with a body portion of the clamper 46 at the terminal of the conveyor 40 (state indicated with solid lines in FIG. 2). When the front end of the work W comes into contact with the body portion of the clamper 46, the clamp jaw 46A is closed, by which the front end portion of the work W is clamped by the clamp jaws 46A and 46B. After the work W has been clamped, the damper turning mechanism is driven to turn the damper 46 through 90 degrees (state indicated with alternate long and two short dashes lines in FIG. 2). Thereby, the work W is raised to a vertical position. Afterwards, the work W is transferred to the transfer robot 44 to be conveyed to the measurement section 16.

The transfer robot 44 receives the work W to be measured from the direction changing device 42 to convey it to the measurement section 16, and also conveys the work W having been measured by the measurement section 16 to the recovery section 18. As shown in FIGS. 1 and 2, the transfer robot 44 includes a rod 50 movable vertically, an arm 52 rotatably provided at the top of the rod 50, and a hand 54 provided at a distal end of the arm 52. The hand 54 has clamp jaws 54A and 54A, which can be opened and closed, at the lower part of the body thereof so that the clamp jaws 54A and 54A hold the work W. The work W held by the hand 54 is received and transferred by the vertical motion of the rod 50, and is conveyed by the turning motion of the arm 52. Therefore, all of the direction changing device 42, the measurement section 16 and the recovery section 18 are arranged on the turning path of the hand 54.

The measurement section 16 measures the length and inside diameter of the work W. As shown in FIG. 1, the measurement section 16 includes a length measuring section 16A, an inside diameter measuring section 16B, and a control unit 16C.

The length measuring section 16A measures a length of a work W. The length measuring section 16A has a work holder 100 and a length measuring device 102.

The work holder 100 is disposed on the movement path of the hand 54 of the transfer robot 44 to hold the work W vertically. The work holder 100 is formed into a columnar shape, and a work receiving hole 104 having a predetermined depth is formed vertically in the top face of the work holder 100. The work W is held vertically by being inserted in the work receiving hole 104.

The length measuring device 102 measures the length of the work W by bringing a measuring arm 106, which moves vertically, into contact with the top of the work W and by detecting the movement distance of the measuring arm 106 at that time.

The measuring arm 106 is disposed horizontally, and the proximal end thereof is supported on an elevating element 114. At the distal end of the measuring arm 106 is fixed a contacting element 108, which is brought into contact with the top of the work W. This contacting element 108 incorporates a pressure sensor so that the contact with the top of the work W is detected by the pressure sensor.

The elevating element 114 is slidably supported on a guide rail 112 provided on a post 110. The elevating element 114 is formed with a threaded hole, and a screw rod 118 is engaged with the threaded hole.

The screw rod 118 is disposed in parallel with the guide rail 112, and both ends thereof are pivotally supported by bearing portions 120, 120 formed at both ends of the post 110. Also, the screw rod 118 is connected with a motor 122 so as to be turned by driving the motor 122. When the screw rod 118 is turned, the elevating element 114 moves vertically, and hence the measuring arm 106 moves vertically. The motor 122 incorporates an encoder, so that the number of revolutions of the motor 122 detected by the encoder is output in the control unit 16C.

The control unit 16C determines the movement distance of the measuring arm 106 from the number of revolutions of the motor 122 detected by the encoder, and calculates the length of the work W based on the movement distance. More specifically, the length of the work W will be measured as described below.

First, a master having a known length is set in the work holder 100. Next, the motor 122 is driven to lower the measuring arm 106 having been positioned at a predetermined measurement waiting position. When the measuring arm 106 lowers, the contacting element 108 comes into contact with the top of the master at a certain height. When the contact with the master is detected by the contacting element 108, the lowering of the measuring arm 106 is stopped. This position is taken as the reference position. The control unit 16C calculates a movement distance $S_0$ of the measuring arm 106 from the measurement waiting position to the reference position, and stores it in a memory incorporated in the control unit 16C.

Next, the motor 122 is driven again to move the measuring arm 106 upward to the measurement waiting position. The master is recovered from the work holder 100, and a work W to be measured is set.

After the work W has been set, the motor 122 is driven to lower the measuring arm 106 again from the measurement waiting position. When the measuring arm 106 lowers, the contacting element 108 comes into contact with a top of the work W at a certain height. When the contact with the work W is detected by the contacting element 108, the lowering of the measuring arm 106 is stopped. The control unit 16C calculates a movement distance S from the waiting position to the position at which the measuring arm 106 stops. Then, the control unit 16C determines a displacement $x(x=S-S_0)$ from the reference position.

This displacement x from the reference position corresponds to a difference between a master length $L_0$ and the work length L. Therefore, the control unit 16C calculates the length $L(L=L_0+x)$ of the work W from the known master length $L_0$ and the determined displacement x.

Figure 3:
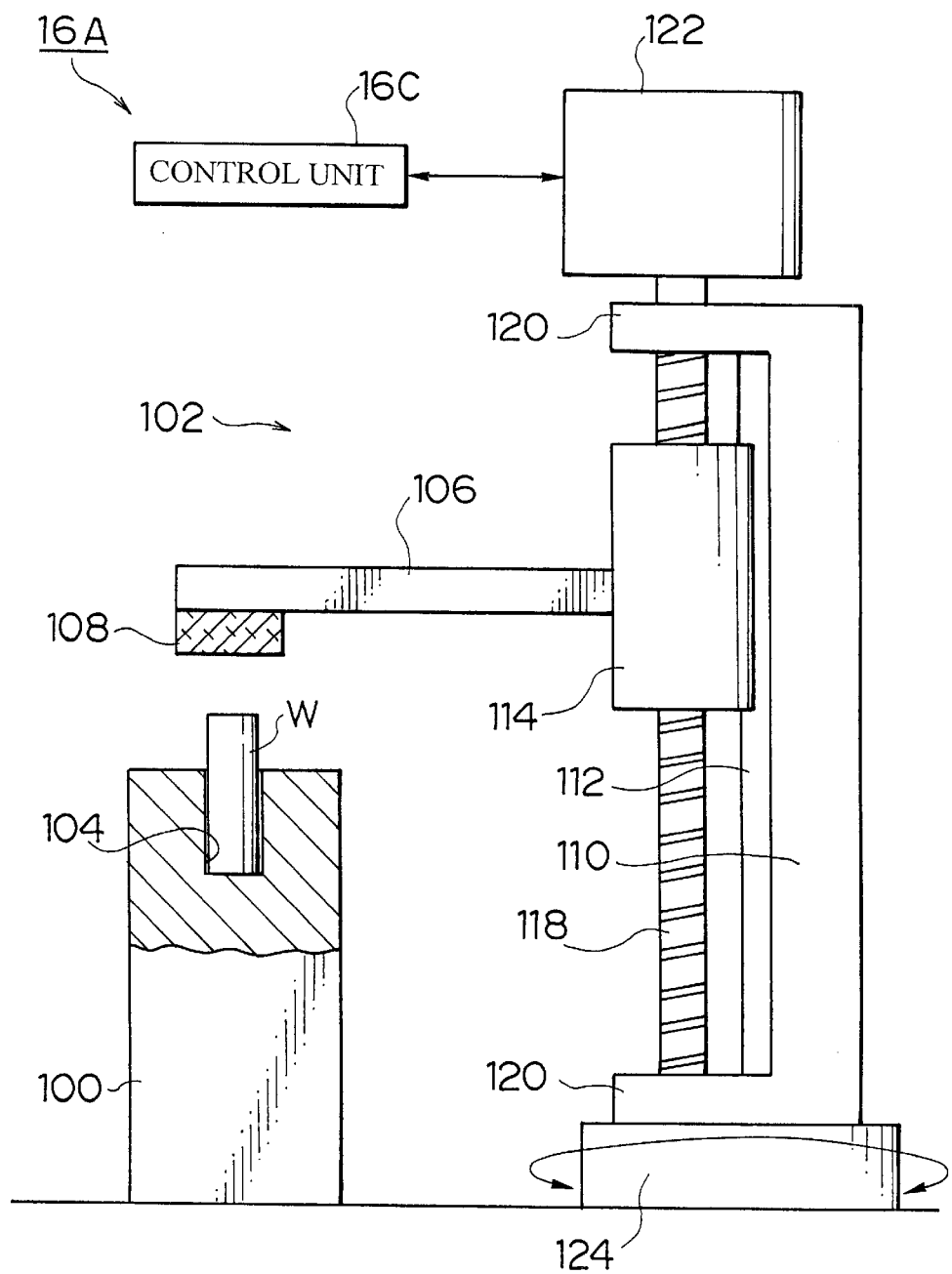
FIG. 3 is a schematic view showing a configuration of a length measuring section.

The measuring arm 106 is rotatable to avoid a collision with the arm 52 of the transfer robot 44. That is, as shown in FIG. 3, the post 110 is provided on a turntable 124 so as to be capable of being turned by the rotational driving of the turntable 124. Usually, the measuring arm 106 is positioned at a retreat position, and only at the time of measurement, it turns to move to the measurement waiting position.

Figure 4:
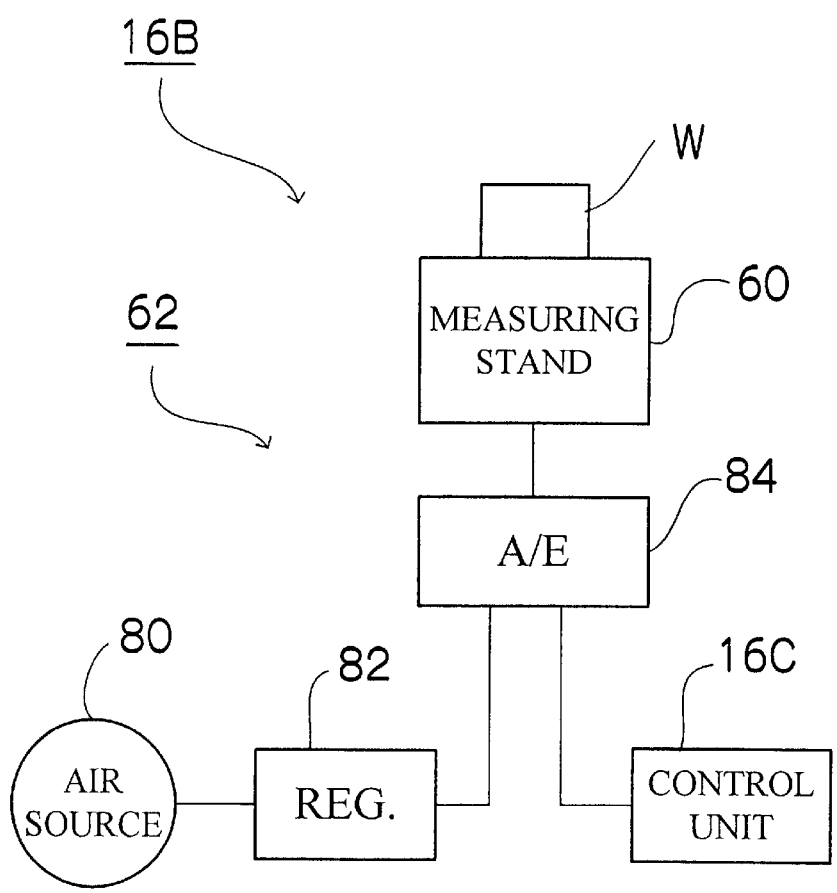
FIG. 4 is a schematic view showing a configuration of an inside diameter measuring section.

As shown in FIGS. 1 and 4, the inside diameter measuring section 16B includes a measuring stand 60 for holding the work W and an air micrometer 62 which is held on the measuring stand 60 to measure the inside diameter of the work W.

Figure 5:
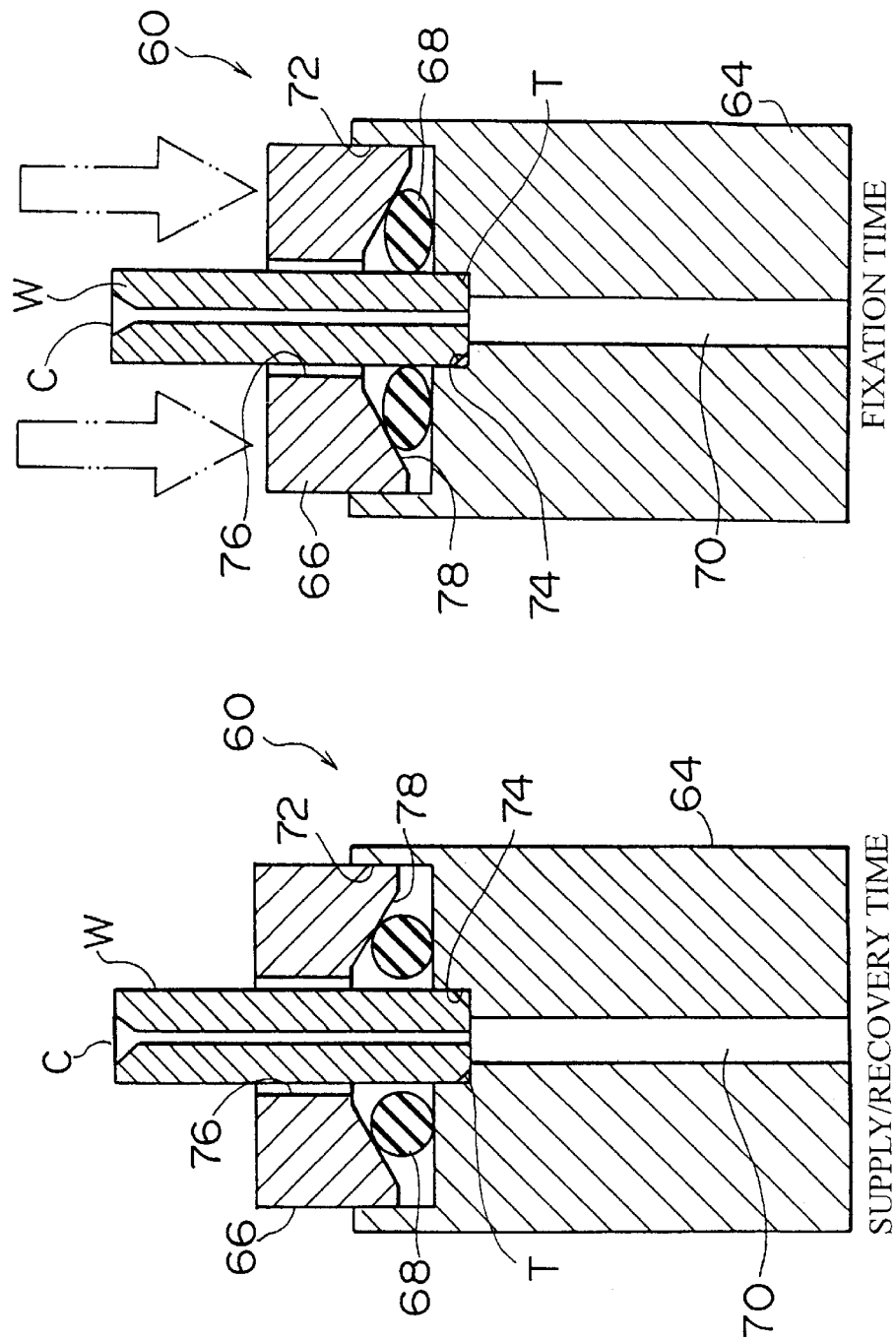
FIGS. 5($a$) and 5($b$) are sectional views showing a configuration of a measuring stand.

The measuring stand 60 is disposed on the movement path of the hand 54 of the transfer robot 44, and holds the work W. As shown in FIGS. 5(a) and 5(b), the measuring stand 60 includes a measuring stand body 64, a pressing ring 66, a holding ring 68, and a pressing device (not shown).

The measuring stand body 64 is disposed vertically, and an air supply passage 70 is formed in a central portion thereof. A circular recess portion 72 is formed in the upper face of the measuring stand body 64, and a work receiving hole 74 is formed in the center of the recess portion 72. The work receiving hole 74 is formed coaxially with the air supply passage 70 so as to have a predetermined depth and an approximately the same diameter as the outside diameter of the work W to be measured.

The pressing ring 66 is formed with a work insertion hole 76 in a central portion thereof, and the work insertion hole 76 is formed so as to have a diameter slightly larger than an outside diameter of the work W. The pressing ring 66 is inserted in the recess portion 72 formed in the upper face of the measuring stand body 64, and is supported so as to be slidable in the recess portion 72 in the axial direction with the inner peripheral face of the recess portion 72 being used as a guide surface. On the lower face of the pressing ring 66, a tapered pressing face 78 which is inclined toward the center is formed, and the holding ring 68 is in contact with the pressing face 78.

The holding ring 68 is formed of an elastic material, and is contained in the recess portion 72 formed in an upper face of the measuring stand body 64. The holding ring 68 is disposed coaxially with the work receiving hole 74, so that when being pressed by the pressing face 78 of the pressing ring 66, the holding ring 68 is collapsed and the inside diameter thereof is reduced. The holding ring 68 used has an inside diameter in the ordinary state (no-load state) which is larger than the outside diameter of the work W to be measured. Therefore, when being inserted through the holding ring 68, the work W is inserted substantially in a non-contact state.

The pressing device (not shown) is configured, for example, by a cylinder to press the pressing ring 66 toward the measuring stand body 64.

The operation of the measuring stand 60 having the above-described configuration will be as described below. As shown in FIG. 5(a), when the work W is inserted through the work insertion hole 76 in the pressing ring 66, the tip end portion of the work W is inserted in the work receiving hole 74 formed in the measuring stand body 64. In this state, as shown in FIG. 5(b), the pressing ring 66 is pressed toward the measuring stand body 64 by the pressing device (not shown), whereby the holding ring 68 is collapsed by the pressing face 78 of the pressing ring 66, the inside diameter thereof being reduced. As a result, the outer peripheral portion of the work W is tightened by the holding ring 68, whereby the work W is held in the measuring stand 60. Also, the holding ring 68 is in close contact with the outer periphery of the work W, whereby a seal is provided between the work W and the work receiving hole 74.

At the time of removing the work W, the pressure applied to the pressing ring 66 by the pressing device is released. Thereby, the pressing ring 66 is restored to the original position by the elastic restoring force of the holding ring 68, and thus the holding ring itself is restored to the original diameter by the elastic restoring force. Thereby, the tightening of work W is released, so that the work W can be removed.

As shown in FIG. 4, the air micrometer 62 includes an air source 80, a regulator 82, and an A/E converter 84.

From the air source 80, a compressed air whose temperature and humidity have been regulated to fixed values is supplied. The regulator 82 regulates the compressed air supplied from the air source 80 so as to have a fixed pressure. The compressed air whose pressure has been regulated to a fixed value by the regulator 82 is supplied to the air supply passage 70 in the measuring stand body 64 via the A/E converter 84.

The compressed air having been supplied into the air supply passage 70 passes through the inner peripheral portion of the work W held in the measuring stand 60 and is discharged to the outside. The A/E converter 84 converts the back pressure of compressed air at this time into an electrical signal by bellows and a differential transformer which are incorporated in the A/E converter 84, and sends the electrical signal to the control unit 16C. The control unit 16C calculates the inside diameter of the work W based on this electrical signal. The calculated inside diameter is displayed on a monitor (not shown) provided in the control unit 16C, and also is recorded as data in the memory incorporated in the control unit 16C.

As shown in FIG. 1, the recovery section 18 separates the works W having been measured into OK works, which have met a predetermined standard, and NG works, which have not met the predetermined standard, and recovers them. The recovery section 18 has an OK work recovery box 90A for containing the OK works and an NG work recovery box 90B for containing the NG works. Each of the recovery boxes 90A and 90B is formed into a box shape whose upper side is open, and both of them are disposed on the movement path of the hand 54 of the transfer robot 44. The work W having been conveyed by the transfer robot 44 is unclamped over each of the recovery boxes 90A and 90B and is put into each of the recovery boxes.

A master storage section 20 stores a plurality of masters. As shown in FIG. 1, the master storage section 20 is provided with a master storage stand 88. The master storage stand 88 is formed into a block shape, and a plurality of master storage holes having a predetermined depth are formed vertically in an upper surface of the master storage stand 88. The masters are stored in the master storage holes.

The master storage stand 88 is disposed on the movement path of the hand 54 of the transfer robot 44, and the master storage holes are also formed on the movement path of the hand 54. Thereby, the master can be taken out of the master storage stand 88 and can be conveyed to the measuring stand 60 by using the transfer robot 44.

The control section carries out drive control of each piece of equipment constituting the inside diameter measuring apparatus 10. This control section carries out drive control of each piece of equipment according to a program stored beforehand.

The operation of the inside diameter measuring apparatus of this embodiment having the above-described configuration will be as described below.

First of all, initialization is carried out. First, a zero-adjusting master $M_0$, a scale-adjusting master $M_v$, and correcting masters $M_1$ to $M_N$ are set on the master storage stand 88.

For the zero-adjusting master $M_0$, the inside diameter $d_0$ and the length $L_0$ thereof are known. For the scale-adjusting master $M_v$, the inside diameter $d_v$ thereof is known (however, $d_0 \neq d_v$).

Also, the correcting masters $M_1$ to $M_N$ are formed so as to have the same inside diameter $d_0$ as that of the zero-adjusting master $M_0$, and the lengths $L_1$ to $L_N$ thereof are known. However, the lengths $L_1$ to $L_N$ each have a different value.

The operator inputs the inside diameters and lengths of the various masters beforehand in the control unit 16C to store them in the memory.

Next, the length measuring device 102 and the air micrometer 62 are calibrated.

First, the transfer robot 44 takes the zero-adjusting master $M_0$ out of the master storage stand 88, and conveys the master to the length measuring section 16A. The zero-adjusting master $M_0$ is set in the work holder 100 of the length measuring section 16A. The setting of the zero-adjusting master $M_0$ will be performed as described below.

First, the hand 54 of the transfer robot 44, which holds the zero-adjusting master $M_0$, moves to a position over the work holder 100, and lowers from this position. Thereby, the zero-adjusting master $M_0$ held by the hand 54 is inserted in the work receiving hole 104 in the work holder 100.

After the zero-adjusting master $M_0$ has been inserted in the work receiving hole 104, the holding of the zero-adjusting master $M_0$ by the hand 54 is released. After releasing, the hand 54 retreats upward. Thereby, the zero-adjusting master $M_0$ is set in the work holder 100.

At this time, the measuring arm 106 of the length measuring device 102 is positioned at a predetermined retreat position.

After the zero-adjusting master $M_0$ has been set in the work holder 100, the turntable 124 is rotationally driven. Thereby, the measuring arm 106 is turned and moved from the retreat position to the measurement waiting position. Afterwards, the reference position is set. That is, the motor 122 is first driven to lower the measuring arm 106. When the measuring arm 106 lowers, the contacting element 108 comes into contact with the top of the master at a certain height. This contact with the master is detected by the contacting element 108, and thereby the lowering of the measuring arm 106 is stopped. This position is taken as the reference position. The control unit 16C calculates the movement distance $S_0$ of the measuring arm 106 from the measurement waiting position to the reference position, and stores the movement distance $S_0$ in the memory incorporated therein.

Next, the motor 122 is driven again to raise the measuring arm 106 to the measurement waiting position. Then, the turntable 124 is rotationally driven to move the measuring arm 106 to the retreat position.

By the above-described operation, the calibration of the length measuring device 102 is completed. Subsequently, the air micrometer 62 is calibrated.

After the measuring arm 106 has retreated to the retreat position, the transfer robot 44 recovers the zero-adjusting master $M_0$ from the work holder 100, and conveys it to the inside diameter measuring section 16B. Then, the zero-adjusting master $M_0$ is set in the measuring stand 60 of the inside diameter measuring section 16B.

The setting of the zero-adjusting master $M_0$ is performed as described below. First, the hand 54 of the transfer robot 44, which holds the zero-adjusting master $M_0$, moves to a position over the measuring stand 60, and lowers while holding the zero-adjusting master $M_0$. Thereby, the zero-adjusting master $M_0$ held by the hand 54 is inserted in the work insertion hole 76 in the pressing ring 66. At this time, the zero-adjusting master $M_0$ is inserted in the work insertion hole 76 in a state where an inner peripheral chamfered portion thereof faces upward.

After the zero-adjusting master $M_0$ has been inserted in the work insertion hole 76, the holding of the zero-adjusting master $M_0$ by the hand 54 is released. After releasing, the hand 54 retreats upward temporarily.

After the hand 54 has retreated, the pressing device (not shown) is driven to press the pressing ring 66 toward the measuring stand body 64. Thereby, the holding ring 68 is collapsed by the pressing ring 66, so that the zero-adjusting master $M_0$ is held by the collapsed holding ring 68, and thus is held in the measuring stand 60. The tip end portion of the zero-adjusting master $M_0$ held in the measuring stand 60 is inserted in the work receiving hole 74, and a gap between the zero-adjusting master $M_0$ and the work receiving hole 74 is sealed by the collapse of the holding ring 68. Therefore, even when air is supplied to the air supply passage 70, all of the air is supplied to the inner peripheral portion of the zero-adjusting master $M_0$ without leaking through the gap.

After the zero-adjusting master $M_0$ has been set in the measuring stand 60 in the above-described manner, the air source 80 is driven, whereby compressed air whose pressure has been regulated to a fixed value by the regulator 82 is supplied to the air supply passage 70 in the measuring stand 60 via the A/E converter 84. The compressed air supplied to the air supply passage 70 passes through the inner peripheral portion of the zero-adjusting master $M_0$ and is discharged to the outside. The back pressure of compressed air at this time is detected by the A/E converter 84, and is output to the control unit 16C as an electrical signal. The control unit 16C stores the back pressure data of the zero-adjusting master $M_0$, which has been output as an electrical signal, in the memory incorporated therein.

When the measurement of the zero-adjusting master $M_0$ is complete, the supply of air is stopped, and the zero-adjusting master $M_0$ is unlocked. Specifically, the pressing of the pressing ring 66 by the pressing device is released, and thus the tightening of the zero-adjusting master $M_0$ by the holding ring 68 is released.

After the pressing of the pressing ring 66 has been released, the hand 54 of the transfer robot 44, which has waited at the upper position, lowers to hold the zero-adjusting master $M_0$ set in the measuring stand 60. The hand 54 rises while holding the zero-adjusting master $M_0$ to recover it from the measuring stand 60.

The recovered zero-adjusting master $M_0$ is returned to the original position on the master storage stand 88 by the transfer robot 44.

After the measurement of the zero-adjusting master $M_0$ has been completed, the transfer robot 44 then takes the scale-adjusting master $M_v$ out of the master storage stand 88, and conveys it to the measurement section 16. The scale-adjusting master $M_v$ having been conveyed to the measurement section 16 is set in the measuring stand 60 in the same way as the zero-adjusting master $M_0$ to make measurement of the back pressure. Upon completion of the measurement, the scale-adjusting master $M_v$ is returned to the original position on the master storage stand 88 in the same way as the zero-adjusting master $M_0$.

After the measurement of the back pressures of the zero-adjusting master $M_0$ and the scale-adjusting master $M_v$ has been completed as described above, the control unit 16C determines the relationship between the change of inside diameter and the change of back pressure (back pressure characteristics) based on the back pressure data of the measured zero-adjusting master $M_0$, the back pressure data of the measured scale-adjusting master $M_v$, and the known inside diameters $d_0$ and $d_v$. Also, the measured value of back pressure of the zero-adjusting master $M_0$ is set to the reference value for measurement. In the subsequent measurement, by detecting the back pressure change with respect to the zero-adjusting master $M_0$, the inside diameter d of the work W is measured.

By the above-described operation, the calibration of the air micrometer 62 is completed.

Next, the measurement of a correction amount of measured value based on the length L of work is made.

First, the transfer robot 44 takes the first correcting master $M_1$ (length: $L_1$) out of the master storage stand 88, and conveys it to the inside diameter measuring section 16B to set it in the measuring stand 60. After the first correcting master $M_1$ has been set in the measuring stand 60, the back pressure thereof is measured as in the case of the zero-adjusting master $M_0$. The control unit 16C calculates the inside diameter $d_1$, of the first correcting master $M_1$ from the measured back pressure, and stores it in the memory so as to cause it to correspond to the length $L_1$.

After the measurement of the first correcting master $M_1$ has been completed, the transfer robot 44 recovers the first correcting master $M_1$ from the measuring stand 60, and returns it to the original position on the master storage stand 88.

Next, the transfer robot 44 takes the second correcting master $M_2$ (length: $L_2$) out of the master storage stand 88, and conveys the master to the inside diameter measuring section 16B to set it in the measuring stand 60. After the second correcting master $M_2$ has been set in the measuring stand 60, the back pressure thereof is measured in the same way as described above. The control unit 16C calculates the inside diameter $d_2$ of the second correcting master $M_2$ from the measured back pressure, and stores it in the memory so as to cause it to correspond to the length $L_2$.

After the measurement of the second correcting master $M_2$ has been completed, the transfer robot 44 recovers the second correcting master $M_2$ from the measuring stand 60, and returns the master to the original position on the master storage stand 88.

Subsequently, the inside diameter(s) $d_3$ to $d_N$ of the correcting master(s) $M_3$ to $M_N$ stored on the master storage stand 88 is (are) measured successively. The determined inside diameter(s) $d_3$ to $d_N$ is (are) stored in the memory in the control unit 16C so as to correspond to the length(s) $L_3$ to $L_N$, respectively.

After the measurement of inside diameters of all of the correcting masters $M_1$ to $M_N$ has been completed, the control unit 16C determines the correction amount $\epsilon$ of measured value.

Since the zero-adjusting master $M_0$ and the correcting masters $M_1$ to $M_N$ are formed so as to have an equal inside diameter as described above, the same values ought to be output for the measured values $d_0$ to $d_N$.

However, since the masters $M_0$ to $M_N$ have different lengths $L_0$ to $L_N$, the measured values vary.

Thereupon, the length Lo of the zero-adjusting master $M_0$ is taken as the reference, and a difference $(d_0-d_N)$ from the measured value $d_0$ at that time is determined, by which the correction amount $\epsilon$ of measured value for the lengths $L_1$ to $L_N$ is determined.

For example, the measured value of inside diameter at the time of length $L_1$ is $d_1$, and the correction amount $\epsilon_1$ thereof is $\epsilon_1=d_0-d_1$. Also, the measured value of inside diameter at the time of length $L_2$ is $d_2$, and the correction amount $\epsilon_2$ thereof is $\epsilon_2=d_0-d_2$. Similarly, the correction amounts $\epsilon_1$ to $\epsilon_N$ of measured values for the lengths $L_1$ to $L_N$ are determined.

From the relationship between the determined length $L_0$ to $L_N$ and the correction amount $\epsilon_0$ to $\epsilon_N$, a general formula of the length L and the correction amount $\epsilon$, $\epsilon=F(L)$, is determined. The control unit 16C stores the general formula $\epsilon=F(L)$ representing the relationship between the determined length L and the correction amount E in the memory thereof.

By the above-described series of operations, the preliminary operation for measurement is completed. Subsequently, the works W stored in the parts feeder 22 are measured successively.

First, the parts feeder 22 is driven to successively feed the works W through the feed port 26. The work W fed through the feed port 26 is conveyed to the direction changing device 42 by the conveyor 40, and then turned through 90 degrees by the direction changing device 42 to be raised vertically.

The work W raised vertically is received by the hand 54 of the transfer robot 44, and is conveyed to the length measuring section 16A by the turning motion of the arm 52 of the transfer robot 44.

The work W having been conveyed to the length measuring section 16A is set in the work holder 100 so that the length thereof is measured. The measurement of length using the length measuring section 16A will be made as described below.

First, the hand 54 of the transfer robot 44 moves to a position over the work holder 100 and stops there. Then, the arm 52 lowers from this position. The arm 52 lowers through a predetermined distance and stops. Thereby, the work W is inserted in the work receiving hole 104.

After the work W has been inserted in the work receiving hole 104, the holding of work W by the hand 54 is released. Thereafter, the arm 52 moves upward and waits at a position at a predetermined height. Thereby, the work W is set in the work holder 100.

After the work W has been set in the work holder 100, the turntable 124 of the length measuring device 102 is rotationally driven, so that the measuring arm 106 turns from the retreat position to the measurement waiting position.

After the measuring arm 106 has moved to the measurement waiting position, the motor 122 is driven to lower the measuring arm 106. When the measuring arm 106 lowers, the contacting element 108 comes into contact with the top of the work W at a certain height. When this contact is detected, the lowering of the measuring arm 106 is stopped.

The control unit 16C determines the movement distance S from the measurement waiting position to the position at which the measuring arm 106 stops, based on the output from the encoder, and then calculates the length L of the work W based on the determined movement distance S. Specifically, the control unit 16C calculates the displacement x from the reference position, and determines the length L of the work W ($L=L_0+x$) from the displacement x and the known length $L_0$ of the zero-adjusting master $M_0$. The determined length L of the work W is output to the control unit 16C of the inside diameter measuring section 16B.

Upon completion of the measurement, the motor 122 is driven to move the measuring arm 106 upward to the measurement waiting position. Thereafter, the turntable 124 is driven to turn the measuring arm 106, so that the measuring arm 106 moves to the retreat position.

Thus, the measurement of length of the work W is completed. Upon completion of the length measurement, the hand 54 of the transfer robot 44 having waited at a position over the work holder 100 lowers to recover the work W from the work holder 100. The recovered work W is conveyed to the inside diameter measuring section 16B by the transfer robot 44.

The work W having been conveyed to the inside diameter measuring section 16B is set in the measuring stand 60 to measure the inside diameter. The inside diameter will be measured as described below.

First, the work W is inserted in the work insertion hole 76 in the pressing ring 66. Next, the pressing device (not shown) is driven to press the pressing ring 66 toward the measuring stand body 64. Thereby, the holding ring 68 is collapsed by the pressing ring 66, so that the work W is held by the collapsed holding ring 68, and thus is held in the measuring stand 60.

After the work W has been held in the measuring stand 60, the air source 80 is driven, whereby compressed air whose pressure has been regulated to a fixed value by the regulator 82 is supplied to the air supply passage 70 in the measuring stand 60 via the A/E converter 84. The compressed air supplied to the air supply passage 70 passes through the inner peripheral portion of the work W and is discharged to the outside. The back pressure of compressed air at this time is detected by the A/E converter 84, and is output to the control unit 16C as an electrical signal.

The control unit 16C calculates the inside diameter d of the work W based on the electrical signal sent from the A/E converter 84. That is, the inside diameter d of the work W is calculated from a back pressure measured based on the back pressure characteristics determined beforehand.

After the inside diameter d has been measured, the control unit 16C determines the correction amount $\epsilon$ based on the length L of work W, which has been measured by the length measuring section 16A. Then, the control unit 16C corrects the measured value d based on the determined correction amount $\epsilon$ to determine a correct inside diameter d'.

The inside diameter d' having been determined as described above is displayed on the monitor (not shown) provided in the control unit 16C, and also is recorded as data in the memory in the control unit 16C. Then, it is judged whether or not the measured inside diameter d' meets the predetermined standard. That is, it is judged whether the work W is an OK work meeting the predetermined standard or an NG work not meeting the predetermined standard.

The inside diameter used as the reference for this judgment has been stored in advance in the memory in the control unit 16C.

The measurement of inside diameter of the work W will be completed as described above. Upon completion of the measurement, the driving of the air source 80 is stopped, and thus the holding of the work W by the measuring stand 60 is released. Specifically, the pressing of the pressing ring 66 by the pressing device (not shown) is released, so that the tightening of the work W by the holding ring 68 is released. Thereafter, the work W is recovered from the measuring stand 60 by the transfer robot 44, and is conveyed to the recovery section 18.

The works W having been conveyed to the recovery section 18 are separated and recovered in the OK work recovery box 90A and the NG work recovery box 90B according to the judgment result. Specifically, the OK work meeting the predetermined standard is recovered in the OK work recovery box 90A, and the NG work not meeting the predetermined standard is recovered in the NG work recovery box 90B.

The separated recovery will be carried out as described below. When the work W is an OK work, the hand 54 of the transfer robot 44, which has recovered the work W from the measuring stand 60, moves to a position over the OK work recovery box 90A. Then, the hand 54 lowers through a predetermined distance from that position, and thereafter the holding of the work W by the hand 54 is released. Thereby, the work W drops under gravity, and is recovered in the OK work recovery box 90A. On the other hand, when the work W recovered from the measuring stand 60 is an NG work, the hand 54 of the transfer robot 44 moves to a position over the NG work recovery box 90B, and lowers through a predetermined distance from that position. Thereafter, the holding of the work W by the hand 54 is released. Thereby, the work W drops under gravity, and is recovered in the NG work recovery box 90B.

The measurement of inside diameter of one work W is completed by the above-described series of processes. Subsequently, the same operation is repeated successively, by which all of the works W stored in the parts feeder 22 are measured.

As described above, in the inside diameter measuring apparatus 10 of this embodiment, the length L of the work W is measured, and the measured value d of inside diameter is corrected according to the length L of the work W. Therefore, even in the case where a plurality of works W having a different length are measured, accurate measurement can always be made.

In this embodiment, the measuring arm 106 moving vertically is brought into contact with the top of the work W to detect the movement distance of the measuring arm 106 at this time, by which the length of the work W is measured. However, the method of measuring the length of work is not limited to this.

Figure 6:
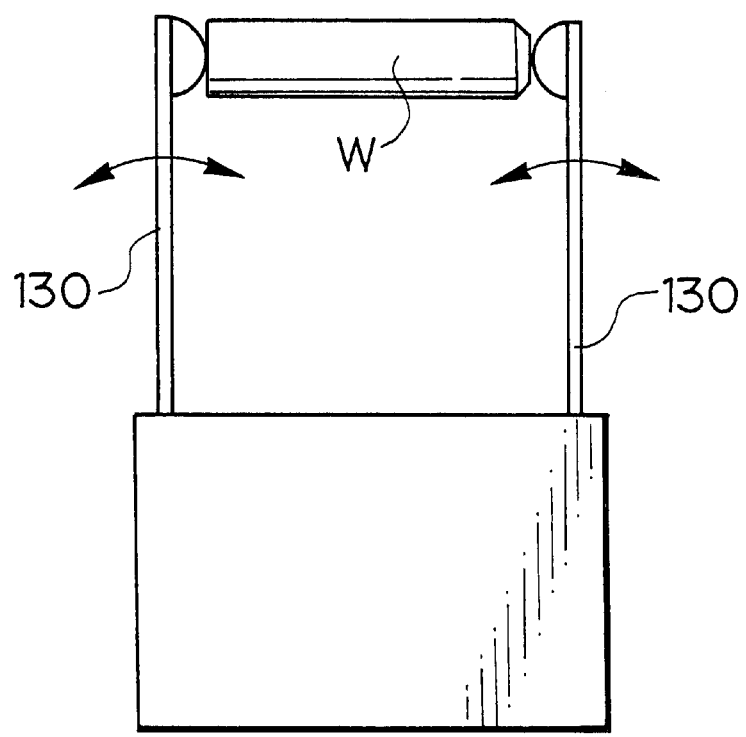
FIG. 6 is a schematic view showing another embodiment of a length measuring device.
Figure 7:
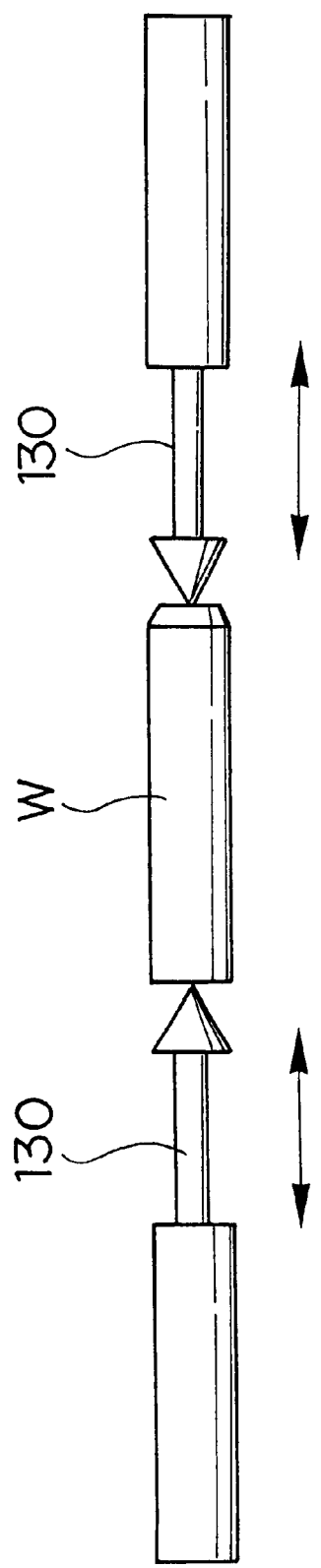
FIG. 7 is a schematic view showing another embodiment of a length measuring device.
Figure 8:
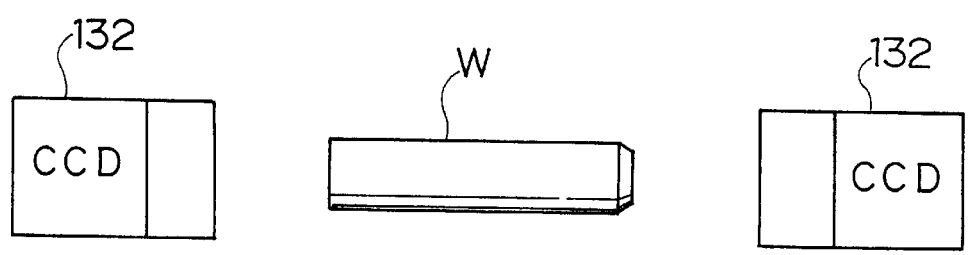
FIG. 8 is a schematic view showing still another embodiment of a length measuring device.

For example, as shown in FIGS. 6 and 7, the length of the work W may be measured by holding the work W by a pair of measuring arms 130, 130 to detect the displacements of the measuring arms 130, 130. Also, as shown in FIG. 8, the length measuring method may be such that the work W is set between a pair of CCD cameras 132, 132 to photograph the end faces of the work W using the CCD cameras 132, 132, by which the length of the work W is measured from the focusing information.

Thus, as a method of measuring the length of the work W, various publicly known methods can be used.

Also, although the measuring section 16 is provided with one length measuring section 16A and one inside diameter measuring section 16B in this embodiment, a plurality of length measuring sections 16A and inside diameter measuring sections 16B may be provided. Thereby, a plurality of works W can be measured at the same time, so that the measurement can be made with high efficiency.

As described above, according to the present invention, since the measured value of inside diameter is corrected according to the length of work, accurate measurement can be made even in the case where a plurality of works having a varied length are measured.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An inside diameter measuring method of measuring an inside diameter of a cylindrical work by supplying compressed air from one end of the work and by detecting a back pressure of the compressed air, wherein a correction amount of measured value of an inside diameter according to a length of the work is obtained in advance by determining a change of measured value of the inside diameter with respect to a change of the length of the work, whereby the measured value of the inside diameter is corrected according to the length of the work.

2. An inside diameter measuring apparatus which measures an inside diameter of a cylindrical work by supplying compressed air from one end of the work and by detecting a back pressure of the compressed air, comprising:

a length measuring device which measures a length of the work;

a storage device which stores a correction amount of measured value of the inside diameter according to the length of the work; and a correcting device which corrects a measured inside diameter of the work based on the length of the work measured by the length measuring device and the correction amount stored in the storage device.

* * * * *